US 7,616,561 B1

(12) United States Patent
Liu et al.

(10) Patent No.: US 7,616,561 B1
(45) Date of Patent: Nov. 10, 2009

(54) SYSTEMS AND METHODS FOR ROUTING DATA IN A COMMUNICATIONS NETWORK

(75) Inventors: Changming Liu, Cupertino, CA (US); Xiaosong Yang, Palo Alto, CA (US); Lin Chen, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 661 days.

(21) Appl. No.: 11/037,180

(22) Filed: Jan. 19, 2005

(51) Int. Cl.
*G06F 11/00* (2006.01)

(52) U.S. Cl. .................. 370/225; 370/232; 370/355
(58) Field of Classification Search .............. 370/254, 370/225, 220, 228, 351, 355; 714/4, 1, 2, 714/3, 41, 43, 44, 45, 46; 709/239, 208, 709/220
See application file for complete search history.

(56) References Cited

U.S. PATENT DOCUMENTS

| 6,954,436 B1* | 10/2005 | Yip et al. ............... 370/254 |
| 7,010,716 B2* | 3/2006 | Yu et al. ................ 714/4 |
| 2004/0117475 A1* | 6/2004 | Taylor et al. ........... 709/224 |

OTHER PUBLICATIONS

Hinden et al Request for Comments 3768 Virtual Router Redundancy Protocol, Apr. 2004.*
Hinden, R., "Virtual Router Redundancy Protocol (VRRP)," Nokia Networking Group Memo, Apr. 2004, pp. 1-27.

* cited by examiner

*Primary Examiner*—Kevin C Harper
*Assistant Examiner*—Henry Baron
(74) *Attorney, Agent, or Firm*—Harrity & Harrity, LLP

(57) ABSTRACT

A network device includes a group of interfaces. Each interface is associated with at least one other interface of the group of interfaces and a group of network addresses. Each interface is configured to monitor at least one of the group of network addresses with which the each interface is associated or the at least one other interface with which the each interface is associated, and determine whether to logically shut down based on the monitoring.

20 Claims, 6 Drawing Sheets

SYSTEMS AND METHODS FOR ROUTING DATA IN A COMMUNICATIONS NETWORK

FIELD OF THE INVENTION

Implementations consistent with the principles of the invention relate generally to communications networks and, more particularly, to systems and methods for routing data in a communications network.

BACKGROUND OF THE INVENTION

A typical communications network includes a lot of different types of network devices. For example, a typical communications network may include host devices, which act as the source or destination of a particular flow of traffic, routers and/or switches, which act to forward traffic flows toward their appropriate destinations, and security devices, which provide, for example, firewall functionality. These different types of network devices may be interconnected via links.

In some instances, a link between a pair of network devices may fail or a network device may fail. In those instances, it is important that the communications network have the capability to route a flow of traffic along a different path (e.g., one that does not include the failed link or failed network device). Currently, when an interface connected to the failed link or network device detects that the link or network device has failed, the interface may physically shut down, preventing all traffic from going through the interface.

SUMMARY OF THE INVENTION

In a first implementation consistent with the principles of the invention, a method includes detecting a problem forwarding a traffic flow via a first interface of a network device, and transferring the traffic flow to a second interface of the network device using layer 3 signaling.

In another implementation consistent with the principles of the invention, a network device includes a group of interfaces. Each interface is associated with at least one other interface of the group of interfaces and a group of network addresses. Each interface is configured to monitor at least one of the group of network addresses with which the each interface is associated or the at least one other interface with which the each interface is associated, and determine whether to logically shut down based on the monitoring.

In still another implementation consistent with the principles of the invention, a method includes monitoring at least one of a group of network addresses with which an interface is associated or at least one other interface with which the interface is associated, and determining whether to logically shut down the interface based on the monitoring.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the principles of the invention improve traffic forwarding within a communications network. In an exemplary implementation, when a problem is detected with respect to communicating a traffic flow, the traffic flow can be moved from one interface in a network device to another interface in the network device using layer 3 signaling.

Exemplary System

Figure 1:
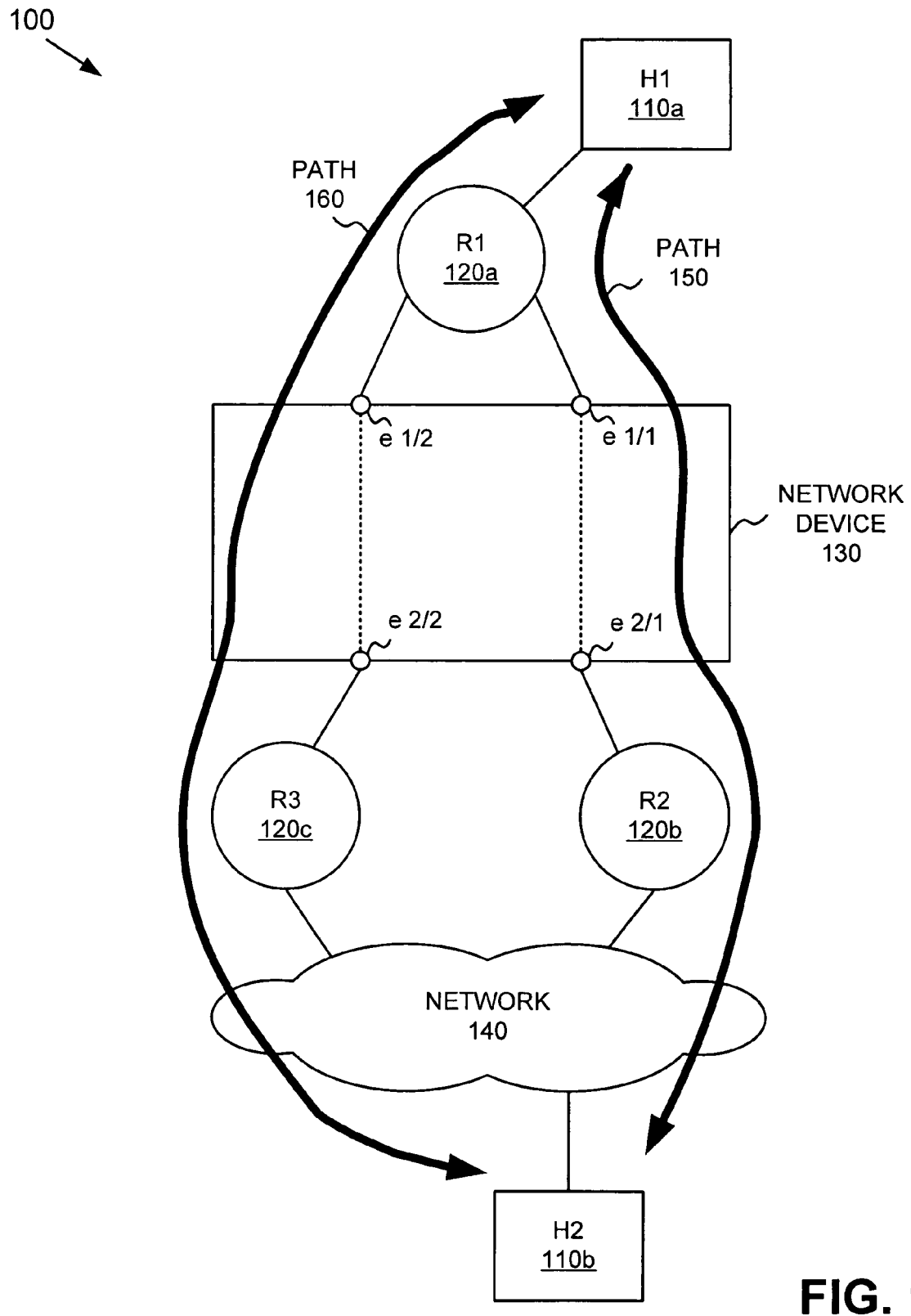
FIG. 1 is an exemplary diagram of a communications network in which systems and methods consistent with the principles of the invention may be implemented.

FIG. 1 is an exemplary diagram of a communications network 100 in which systems and methods consistent with the principles of the invention may be implemented. As illustrated, communications network 100 may include host devices H1 110a and H2 110b (collectively, host devices 110), routing devices R1 120a, R2 120b, and R3 120c (collectively, routing devices 120), a network device 130, and a network 140. It will be appreciated that network 100 may include other devices (not shown) that aid in receiving, processing, and/or transmitting data.

Host devices 110 may include typical host devices, such as mainframes, minicomputers, personal computers, laptops, personal digital assistants (PDAs), wireless telephones, or other types of computational or communication devices, threads or processes running on one of these devices, and/or objects executable by one of these devices. Host devices 110 may communicate with each other by transmitting data units, such as packets, through communications network 100.

Routing devices 120 may include network devices that receive data units, process the data units to determine their destination(s), and forward the data units toward their determined destination(s).

Similar to routing devices 120, network device 130 may include a network device that receives data units, processes the data units to determine their destination(s), and forwards the data units toward their determined destination(s). As illustrated in FIG. 1, network device 130 may include multiple interfaces, depicted as interfaces e 1/1, e 1/2, e 2/1, and e 2/2. Interfaces e 1/1 and e 1/2 may receive data units from routing device R1 120a and transmit data units to routing device R1 120a. Interface e 2/1 may receive data units from routing device R2 120b and transmit data units to routing device R2 120b. Similarly, interface e 2/2 may receive data units from routing device R3 120c and transmit data units to routing device R3 120c. In one implementation consistent with the principles of the invention, interfaces e 1/1 and e 2/1 may be associated with each other, such that data units received on interface e 1/1 are forwarded to interface e 2/1 for forwarding to routing device R2 120c and data units received on interface e 2/1 are forwarded to interface e 1/1 for forwarding to routing device R1 120a. Similarly, interfaces e 1/2 and e 2/2 may be associated with each other, such that data units received on interface e 1/2 are forwarded to interface e 2/2 for forwarding to routing device R3 120c and data units received on interface e 2/2 are forwarded to interface e 1/2 for forwarding to routing device R1 120a. Although four interfaces are depicted in FIG. 1, it will be appreciated that network device 130 may include more or fewer interfaces. Moreover, it will be appreciated that one or more of the interfaces may be associated with more than one other interface. The number of interfaces illustrated in FIG. 1 is provided for explanatory purposes only.

Network 140 may include, for example, a local area network (LAN), a wide area network (WAN), a telephone network, such as the Public Switched Telephone Network (PSTN), an intranet, the Internet, or a combination of networks. In fact, network 140 may include any type of network that is capable of forwarding data units.

In the exemplary communications network 100 illustrated in FIG. 1, traffic can be routed between host H1 110a and host H2 110b via two possible paths (or tunnels). The first path, depicted as path 150, may be from host H1 110a through routing device R1 120a, interfaces e 1/1 and e 2/1 of network device 130, routing device R2 120b, and network 140 to host H2 110b. The second path, depicted as path 160, may be from host H1 110a through routing device R1 120a, interfaces e 1/2 and e 2/2 of network device 130, routing device R3 120c, and network 140 to host H2 110b. Therefore, two paths 150 and 160 may exist for transmitting data units between host H1 110a and host H2 110b. In one implementation, path 150 may be a higher priority path.

Figure 2:
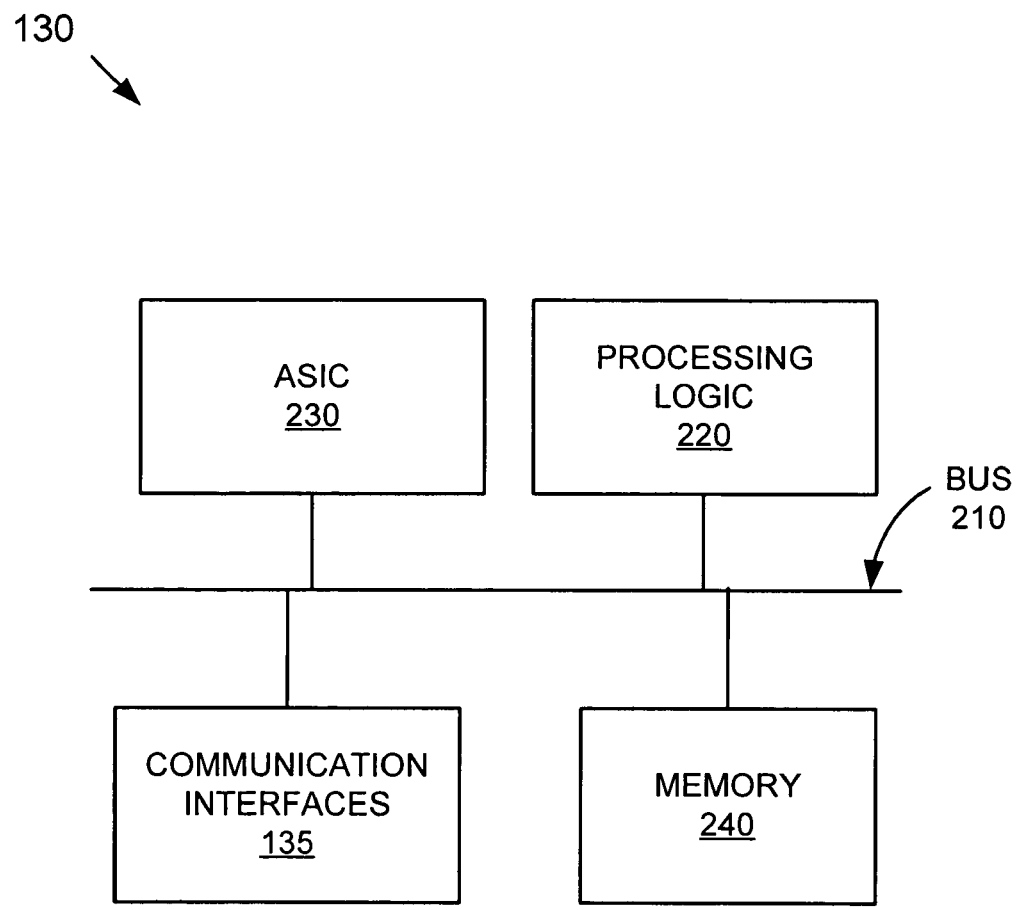
FIG. 2 is an exemplary configuration of the network device of FIG. 1 in an implementation consistent with the principles of the invention.

FIG. 2 is an exemplary configuration of network device 130 of FIG. 1 in an implementation consistent with the principles of the invention. As illustrated, network device 130 may include a bus 210, processing logic 220, an Application Specific Integrated Circuit (ASIC) 230, a memory 240, and a group of communication interfaces 135. Bus 210 permits communication among the components of network device 130.

Processing logic 220 may include any type of conventional processor or microprocessor that interprets and executes instructions. ASIC 230 may include one or more ASICs capable of performing network-related functions. In one implementation, ASIC 230 may perform a security-related function.

Memory 240 may include a random access memory (RAM) or another dynamic storage device that stores information and instructions for execution by processing logic 220; a read only memory (ROM) or another type of static storage device that stores static information and instructions for use by processing logic 220; and/or some other type of magnetic or optical recording medium and its corresponding drive. Communication interfaces 135 may include any transceiver-like mechanism that enables network device 130 to communicate with other devices and/or systems, such as routing devices 120.

As will be described in detail below, network device 130, consistent with the principles of the invention, monitors interfaces 135 and select network addresses (e.g., Internet Protocol (IP) addresses) and logically shuts down interfaces based on the monitoring. Network device 130 may perform these and other operations in response to processing logic 220 executing software instructions contained in a computer-readable medium, such as memory 240. A computer-readable medium may be defined as one or more memory devices and/or carrier waves. The software instructions may be read into memory 240 from another computer-readable medium or from another device via a communication interface 135. The software instructions contained in memory 240 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Figure 3:
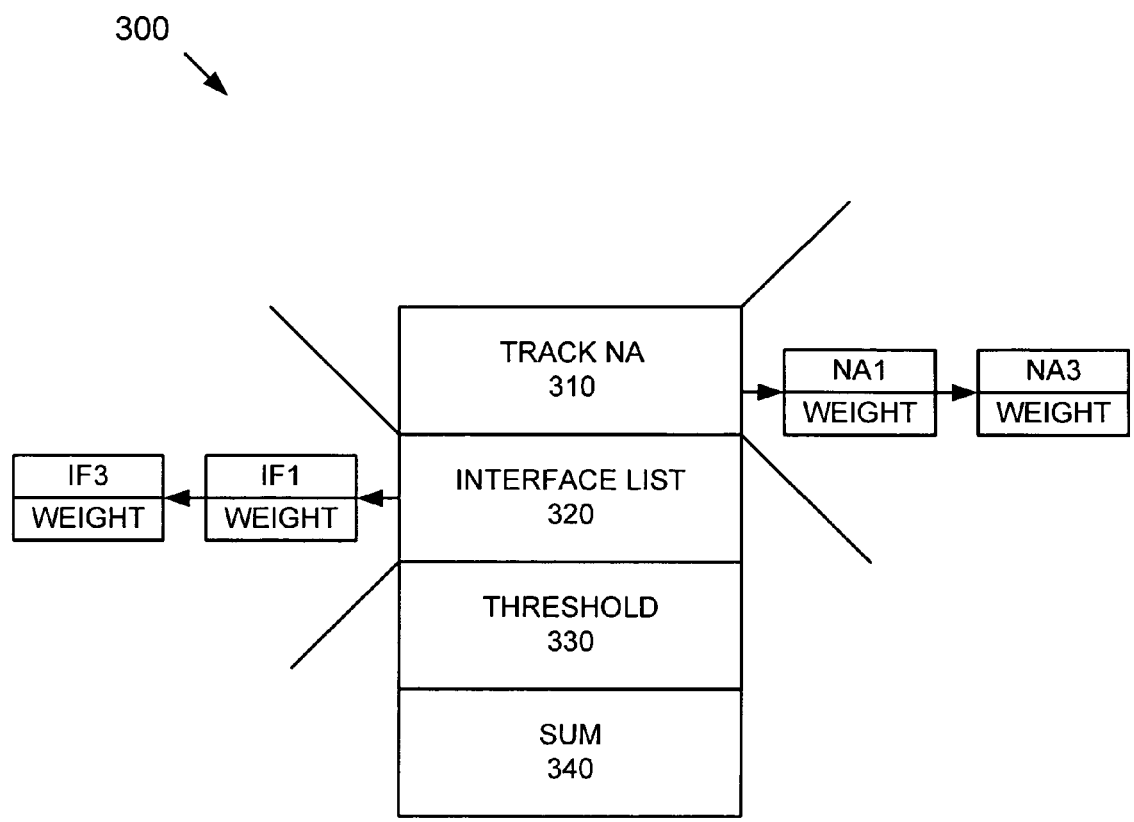
FIG. 3 is an exemplary configuration of a data structure that may be associated with an interface of the network device of FIG. 1 in an implementation consistent with the principles of the invention.

FIG. 3 is an exemplary configuration of a data structure 300 that may be associated with one of interfaces 135 of network device 130 in an implementation consistent with the principles of the invention. In one implementation, each of interfaces 135 of network device is associated with a data structure 300. For explanatory purposes, assume that data structure 300 described below is associated with interface e 1/1 of FIG. 1.

As illustrated, data structure 300 may include a track network address (NA) field 310, an interface (IF) list field 320, a threshold field 330, and a summation (SUM) field 340. Track network address field 310 may store a list of network addresses of which interface e 1/1 will monitor the status. The list can include zero or more entries. For example, interface e 1/1 (FIG. 1) may monitor the status of host H1 110a. Therefore, the network address (e.g., an IP address) of host H1 110a may be stored in field 310 for interface e 1/1. As another example, interface e 2/1 (FIG. 1) may monitor the status of host H2 110b. Therefore, the network address (e.g., an IP address) of host H2 110b may be stored in field 310 for interface e 2/1. Each network address in track network address field 310 may be associated with a weight value. The weight values may be configurable.

Interface list field 320 may store a list of zero or more interfaces to be monitored. In one implementation, interface list field 320 may store a list of those interfaces associated with interface e 1/1. As set forth above, in the exemplary configuration illustrated in FIG. 1, interface e 1/1 may be associated with interface e 2/1. Therefore, information identifying interface e 2/1 may be stored in interface field 320. If interface e 1/1 were associated with more than one interface, information identifying each interface would be stored in field 320. Each interface identified in interface list field 320 may be associated with a weight value. The weight values may be configurable.

Threshold field 330 may store a configurable threshold value. The threshold value may be an integer value greater than or equal to 1. Summation field 340 may store a value representing a current status level of interface e 1/1. The manner in which the summation value is determined is described in detail below with respect to the process of FIG. 4.

Exemplary Processing

Figure 4:
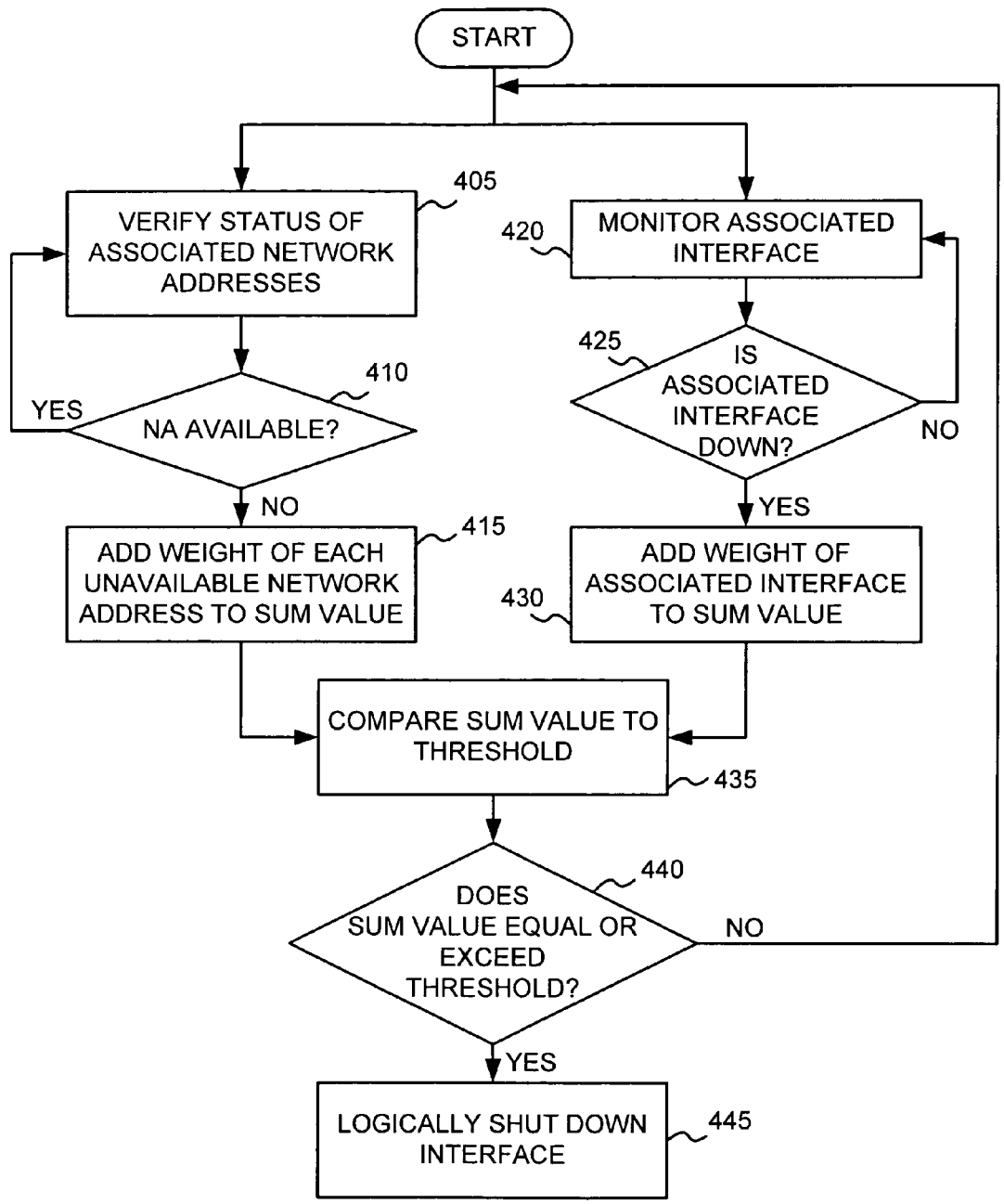
FIG. 4 is a flowchart of an exemplary process for routing data units in a communications network in an implementation consistent with the principles of the invention.

FIG. 4 is a flowchart of an exemplary process for routing data units in communications network 100 in an implementation consistent with the principles of the invention. The following process may be implemented by processing logic 220 for the interfaces of network device 130. Processing may begin by verifying the status of the network addresses stored in field 310 of database 300 associated with an interface (act 405). In one implementation, processing logic 220 may ping each network address stored in field 310 of database 300. Other techniques may alternatively be used. For example, an address resolution protocol (ARP) command may be used to verify the status of the network addresses stored in field 310. In one implementation, the choice of network address verification technique may be user configurable.

Processing logic 220 may determine whether any of the network addresses are unavailable (e.g., the device associated with the network address cannot be reached) (act 410). Processing logic 220 may determine that a particular network address is not available when a reply to a ping request to that network address has not received. If each of the network addresses is determined to be available, processing may return to act 405 with processing logic 220 re-verifying the status of the network addresses for the interface. In one implementation, processing logic 220 may verify the status of the network addresses at a periodic time interval, such as every second. The time interval may be configurable.

If processing logic 220 determines that one or more of the network addresses are unavailable (act 410), processing logic 220 may add the weights of the unavailable network addresses to the summation value in summation field 340 (act 415). The summation value may be zero (or some other predetermined value) when all of the network addresses and the associated interfaces are determined to be available.

During, before, or after the time that processing logic 220 is monitoring the status of the network addresses in track network address field 310 of database 300, processing logic 220 may monitor the status of the associated interfaces identified in interface list field 320 of database 300 (act 420). In one implementation, an interface may receive event messages from each interface identified in field 320 of database 300. Processing logic 220 may determine whether any of the associated interfaces are down (act 425). Processing logic 220 may determine that a particular associated interface is down when an event message is received from that associated interface. If each of the associated interfaces is determined to be available (i.e., not down), processing may return to act 420 with processing logic 220 continuing to monitor the status of the associated interfaces. In one implementation, processing logic 220 may verify the status of the associated interfaces at a periodic time interval, such as every second. The time interval may be configurable.

If processing logic 220 determines that one or more of the associated interfaces are unavailable (act 425), processing logic 220 may add the weights of the associated interfaces that are determined to be down to the summation value in summation field 340 for the interface (act 430). As set forth above, the summation value may be zero (or some other predetermined value) when all of the network addresses and the associated interfaces are determined to be available.

Processing logic 220 may compare the summation value in summation field 340 for the interface to the threshold value in field 330 (act 435). Processing logic 220 may make this comparison at predetermined periods. If the summation value does not equal or exceed the threshold value (act 440), processing may return to act 405 and/or act 420. If, on the other hand, the summation value equals or exceeds the threshold value (act 440), the interface may be logically shut down by processing logic 220 (act 445). Logically shutting down an interface means that the interface is shut down at the layer 3 level, as opposed to physically shutting down the interface, which is performed at the layer 1 or layer 2 level. To logically shut down an interface, a routing protocol associated with the interface may notify associated network devices in communications network 100, using layer 3 signaling, not to use that interface. For example, assuming that the interface is interface e 1/1 in FIG. 1, interface e 1/1 may notify routing device R1 120*a* and/or host device H1 110*a* to use another path for routing data units. The routing protocol may be an Open Shortest Path First (OSPF) protocol or other type of protocol.

In response to this notification, routing device R1 120*a* may change the priority of its outgoing interface so, for example, traffic from host H1 110*a* to host H2 110*b* is routed to a different interface of network device 130. In essence, the notification tells routing device R1 120*a* to find another path (or tunnel) for routing traffic between, for example, this particular host and destination pair (i.e., H1 110*a* and H2 110*b*).

Once an interface (e.g., interface e 1/1) is logically shut down due to network address tracking, processing logic 220 may continue to verify the status of the network addresses associated with interface e 1/1. For example, processing logic 220 may continue to send ping (or ARP) commands to the network addresses associated with interface e 1/1 and then re-compute the summation value to determine whether interface e 1/1 should be logically brought back up. Moreover, as set forth above, an interface becoming logically shut down may cause another interface (e.g., interface e 2/1) to be logically shut down. Therefore, logically bringing interface e 1/1 back up can cause interface e 2/1 (and any other interfaces that monitor the status of interface e 1/1) to be logically brought back up.

The following example illustrates the above processing. With reference to FIG. 1, assume for this example that a traffic flow has been established between host H1 110*a* and host H2 110*b* via path 150. Moreover, assume that interface e 1/1 is associated with exemplary data structure 500 illustrated in FIG. 5 and that interface e 2/1 is associated with exemplary data structure 600 illustrated in FIG. 6.

Figure 5:
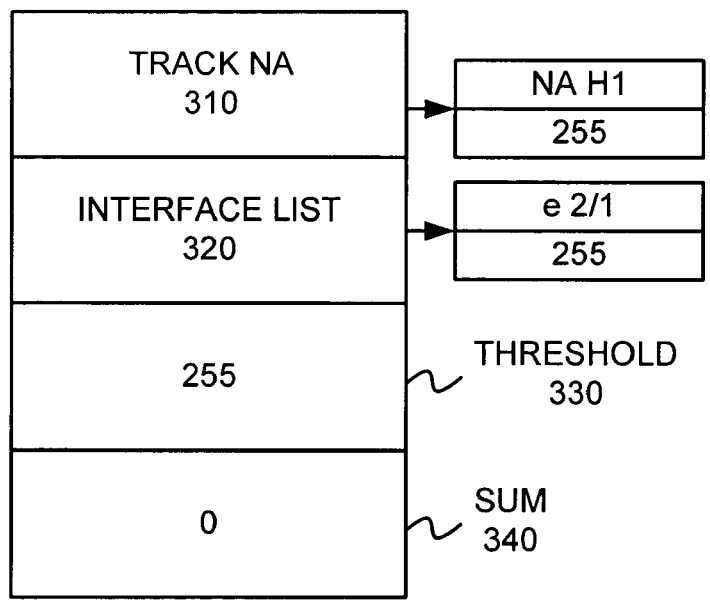
FIGS. 5 and 6 are exemplary data structures that may be associated with interfaces of the network device of FIG. 1 in an implementation consistent with the principles of the invention.

With reference to FIG. 5, assume that track network address field 310 stores the network address for host H1 110*a*, which has a weight assigned to it of 255, that interface list field 320 stores information identifying interface e 2/1, which has a weight assigned to it of 255, that the threshold value in threshold field 330 is 255, and the summation value in summation field 340 is 0.

Figure 6:
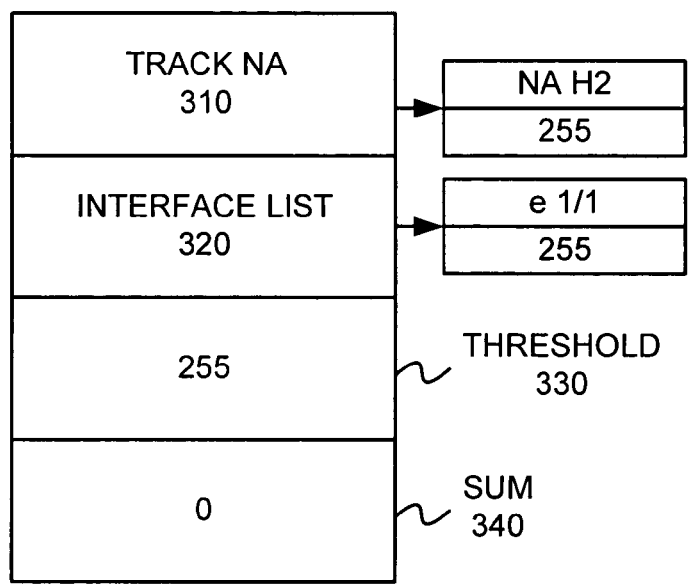

With reference to FIG. 6, assume that track network address field 310 stores the network address for host H2 110*b*, which has a weight assigned to it of 255, that interface list field 320 stores information identifying interface e 1/1, which has a weight assigned to it of 255, that the threshold value in threshold field 330 is 255, and the summation value in summation field 340 is 0.

Processing may begin with processing logic 220 determining whether interface e 2/1 can reach host H2 110*b* and monitoring the status of interface e 1/1. Assume for this example that interface e 2/1 does not receive a reply to a ping request sent to host H2 110*b*. In response, processing logic 220 may add the weight (255) associated with the network address of host H2 110*b* to the summation value (0) in summation field 340 for interface e 2/1. The new summation value (255) may then be compared to the threshold value (255) in threshold field 330. Since the new summation value (255) matches the threshold value (255), processing logic 220 logically shuts down interface e 2/1.

During this time, processing logic 220 is also monitoring the status of the network address and interface e 2/1 in its data structure 500 for interface e 1/1. Processing logic 220 will detect that interface e 2/1 has shut down. In response, processing logic 220 may add the weight (255) associated with interface e 2/1 to the summation value (0) in summation field 340 for interface e 1/1. The new summation value (255) may then be compared to the threshold value (255) in threshold field 330 by processing logic 220. Since the new summation value (255) matches the threshold value (255), interface e 1/1 logically shuts down. Processing logic 220 may then use a routing protocol associated with interface e 1/1 to notify routing device R1 120a to find another path for routing traffic between host H1 110a and host H2 110b. Routing device R1 120a may find another path, such as path 160, for routing the traffic between host H1 110a and host H2 110b. In this way, processing logic 220 can notify a routing device R1 120a to switch to another path without physically shutting down interface e 1/1. Moreover, by logically shutting down interface e 1/1, as opposed to physically shutting down interface e 1/1, traffic can still flow between routing device R1 120a and interface e 1/1. For example, interface e 1/1 may include multiple logical interfaces. The above processing may cause one of the logical interfaces of interface e 1/1 (e.g., the one associated with the traffic flow between hosts H1 110a and H2 110b) to be logically shut down, while the remaining logical interfaces remain active.

Thereafter, when routing device R1 120a receives a data unit from host H1 110a for host H2 110b, routing device R1 120a may forward the data unit to interface e 1/2 of network device 130. Interface e 1/2 may forward the data unit to interface e 2/2, which may then forward the data unit to host H2 110b via routing device R3 120c and network 140. In this way, a flow from a source/destination pair (or between subnets) can be moved from one interface in a network device 130 to another interface in network device 130 using layer 3 signaling.

CONCLUSION

Systems and methods consistent with the principles of the invention improve traffic forwarding within a communications network. In an exemplary implementation, when a problem is detected with respect to communicating a traffic flow, the traffic flow can be moved from one interface in a network device to another interface in the network device using layer 3 signaling.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 4, the order of the acts may be varied in other implementations consistent with the invention. Moreover, non-dependent acts may be implemented in parallel.

Although embodiments consistent with the principles of the invention teach processing logic 220 monitoring the interfaces, processing data flowing into the interfaces, and sending data out the interfaces, in other embodiments consistent with the principles of the invention, each of the interfaces may have their own processing capability to perform the processing of processing logic 220 in a distributed manner.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A network device comprising:
   a first input interface to:
      receive a traffic flow from an upstream device,
      detect a problem forwarding the traffic flow, and
      cause the traffic flow from the upstream device to be transferred to a second input interface associated with the network device using layer 3 signaling; and
   a data structure associated with the first input interface and including:
      a group of network addresses, each network address in the group of network addresses being associated with a weight,
      a list of interfaces within the network device that are associated with the first input interface, each interface in the list of interfaces being associated with a weight,
      a threshold value, and
      a summation value.

2. The network device of claim 1 where the first input interface is further configured to:
   track the group of network addresses, and
   monitor a status of each of the interfaces that is associated with the first input interface.

3. The network device of claim 2 where, when detecting a problem, the first input interface is to:
   identify, based on the tracking, a network address that cannot be reached,
   add the weight associated with the network address to the summation value to form a new summation value,
   compare the new summation value to the threshold value, and
   determine whether to cause the traffic flow to be transferred to the second input interface based on the comparison of the new summation value to the threshold value.

4. The network device of claim 2 where, when detecting a problem, the first input interface is to:
   identify, based on the monitoring, an interface in the list of interfaces that is down,
   add the weight associated with the identified interface to the summation value to form a new summation value,
   compare the new summation value to the threshold value, and
   determine whether to cause the traffic flow to be transferred to the second input interface based on the comparison of the new summation value to the threshold value.

5. The network device of claim 2 where the first input interface tracks the group of network addresses at a time interval.

6. The network device of claim 5 where the time interval is configurable.

7. The network device of claim 2 where the first input interface monitors a status of each of the interfaces that is associated with the first input interface at a time interval.

8. The network device of claim 7 where the time interval is configurable.

9. The network device of claim 1 where the weights associated with the group of network addresses and the weights associated with the list of interfaces are configurable.

10. The network device of claim 1 where, when causing the traffic flow to be transferred to a second input interface, the first input interface is to:
    notify the upstream device using a layer 3 routing protocol to stop forwarding the traffic flow to the first input interface.

11. The network device of claim 1 where, when causing the traffic flow to be transferred to a second input interface, the first input interface is to:
    logically shut down the first input interface with respect to the traffic flow.

12. A network device comprising:
a plurality of interfaces, each interface of the plurality of interfaces being associated with at least one other interface of the plurality of interfaces and a group of network addresses, each interface of the plurality of interfaces being to:
monitor at least one of the group of network addresses with which the each interface is associated or the at least one other interface with which the each interface is associated, and
determine whether to logically shut down based on the monitoring; and
a group of data structures, each data structure in the group of data structures being associated with one of the interfaces in the plurality of interfaces and including:
information identifying the group of network addresses, each network address in the group of network addresses being associated with a weight,
information identifying the at least one other interface, each interface of the at least one interface being associated with a weight,
a threshold value, and
a summation value.

13. The network device of claim 12 where each interface of the plurality of interfaces is to:
identify, based on the monitoring the group of network addresses, a network address that cannot be reached,
add the weight associated with the network address to the summation value to form a new summation value,
compare the new summation value to the threshold value, and
determine whether to logically shut down based on the comparison of the new summation value to the threshold value.

14. The network device of claim 12 where each interfaces of the plurality of interfaces is to:
identify, based on the monitoring the at least one other interface, an interface in the at least one other interface that is down,
add the weight associated with the identified interface to the summation value to form a new summation value,
compare the new summation value to the threshold value, and
determine whether to logically shut down based on the comparison of the new summation value to the threshold value.

15. The network device of claim 12 where each interface of the plurality of interfaces is further to:
cause, when the each interface is logically shut down, an upstream network device to be notified that the each interface is logically shut down.

16. The network device of claim 15 where the each interface notifies the upstream network device via layer 3 signaling.

17. A method comprising:
monitoring at least one of a group of network addresses with which an interface is associated or at least one other interface with which the interface is associated, where the monitoring a group of network addresses with which the interface is associated includes:
identifying those network addresses in the group of network addresses that are unreachable, and
where the monitoring at least one other interface with which the interface is associated includes:
identifying those interfaces of the at least one interface that are down;
determining whether to logically shut down the interface based on the monitoring; and
logically shutting down the interface based on the determining, the logically shutting down leaving the interface physically active,
where each network address in the group of network addresses is associated with a weight,
where each interface of the at least one interface is associated with a weight, and
where the determining includes:
accumulating the weights associated with those network addresses that are determined to be unreachable and those interfaces of the at least one interface that are determined to be down to obtain an accumulated value, and
comparing the accumulated value to a threshold.

18. The method of claim 17 where the weights associated with the group of network addresses and the weights associated with the at least one interface are configurable.

19. The method of claim 17 where the monitoring a group of network addresses with which an interface is associated and the monitoring at least one other interface with which the interface is associated are performed at time intervals.

20. The method of claim 19 where the time intervals are configurable.

* * * * *